United States Patent
Penge

(10) Patent No.: US 7,383,677 B2
(45) Date of Patent: Jun. 10, 2008

(54) PRE-BRAIDED HORSE TAIL

(76) Inventor: Lisa A. Penge, 2785 State Hwy. 30, Gloversville, NY (US) 12078

( * ) Notice: Subject to any disclaimer, the term of this patent is extended or adjusted under 35 U.S.C. 154(b) by 277 days.

(21) Appl. No.: 11/254,257

(22) Filed: Oct. 19, 2005

(65) Prior Publication Data
US 2007/0084155 A1   Apr. 19, 2007

(51) Int. Cl.
B68C 5/00 (2006.01)
(52) U.S. Cl. .......................... 54/80.1; 54/76
(58) Field of Classification Search .............. 54/76, 54/78, 80.1; 132/53
See application file for complete search history.

(56) References Cited

U.S. PATENT DOCUMENTS

| 147,471 A | * | 2/1874 | Bernsee | 54/76 |
|---|---|---|---|---|
| 384,734 A | * | 6/1888 | Aldrich | 54/76 |
| 721,197 A | | 2/1903 | Jordan | |
| 3,347,018 A | * | 10/1967 | Laidig | 54/78 |
| 4,038,996 A | | 8/1977 | Eronini et al. | |
| 4,233,942 A | | 11/1980 | Williams | |
| 5,025,613 A | | 6/1991 | Connors | |
| 5,062,256 A | | 11/1991 | Kingett et al. | |
| 5,086,612 A | * | 2/1992 | Anderson | 54/78 |
| D414,004 S | | 9/1999 | Harvison | |

* cited by examiner

*Primary Examiner*—Rob Swiatek

(57) ABSTRACT

A cover includes a body having a braided section and a plurality of side sections to which panels and hook-and-loop fastening elements are attached. A tail section includes tail hairs that have been customized to enhance the appearance of a horse's tail and is connected to the braided section of the body. The hairs can also form the braided section of the body. The body is attached to the dock section of the horse's tail using the hook-and-loop fastener elements and the hairs of the tail section are integrated into the hairs of the horse's tail.

1 Claim, 1 Drawing Sheet

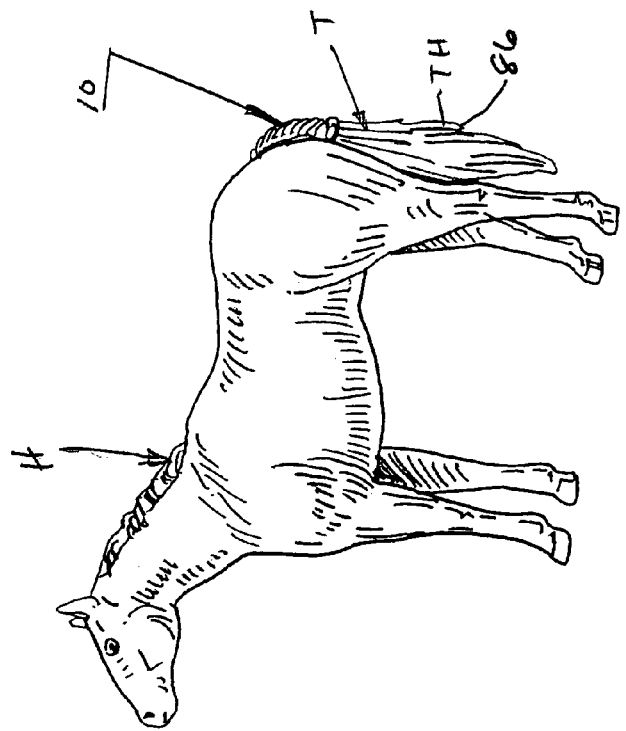
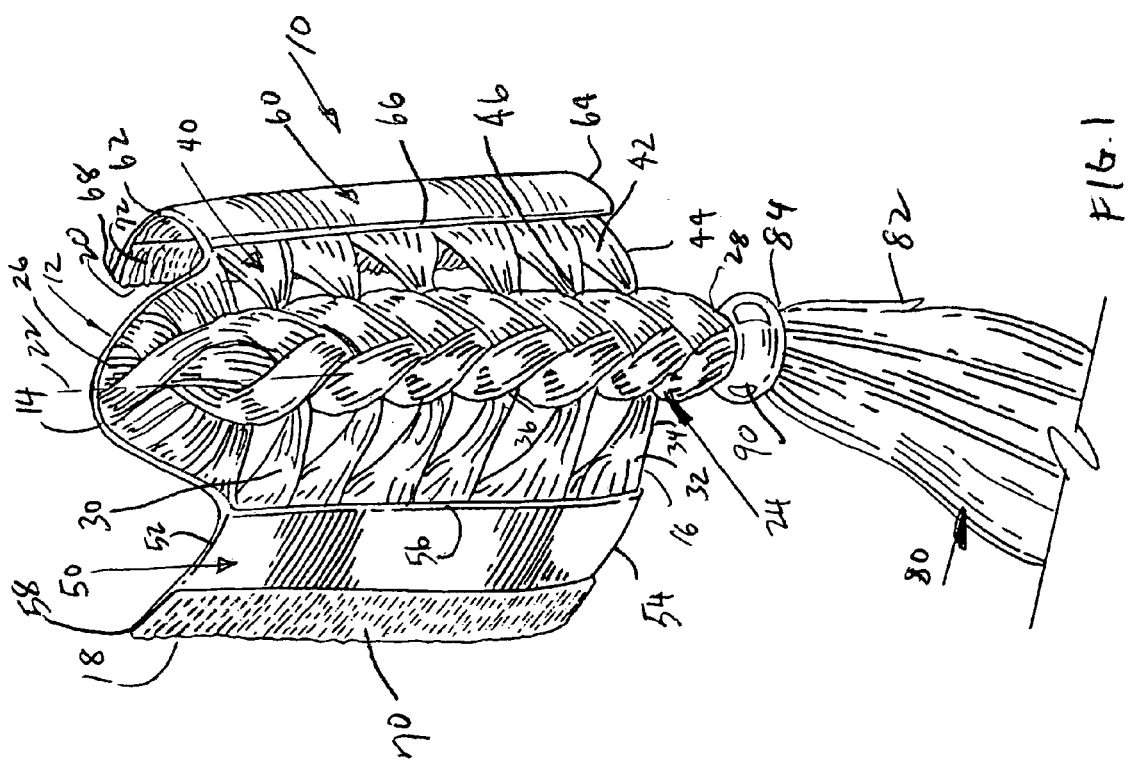
FIG. 1
FIG. 2

PRE-BRAIDED HORSE TAIL

BACKGROUND OF THE INVENTION

1. Field of the Invention

This invention relates in general to animal husbandry, and in particular to accessories for use on animals, such as show horses.

2. Background of the Invention

The riding of horses in shows for dressage to compete with other horses and riders to display the talents of the horse and rider is an ever increasing popular sport. In one form of dressage competition the performance of various gaits and steps that have been laboriously taught to the horse are judged. Further, horse jumping in shows is also extremely popular, particularly for young men and women with the considerable support from their families. The sports are sufficiently popular to be included in the international Olympic program.

The appearance of the horse is very important to the participants and grooming the horse requires a major effort not only on a daily basis for regular grooming, but with particular emphasis and effort immediately before any show. A good deal of time is spent on the tail of the horse. Because of its location and the continuous use by the horse to discourage inserts, the tail tends to become dirty and tangled almost immediately after grooming, almost always requiring a major last minute effort to properly clean, brush and prepare the horse's tail.

Traditional tail covers are made in the form of a bag or other enclosure, and are attached to the animal by fastening a strap that extends over the back of the animal, and usually wraps around the neck of the animal. Thus, traditional tail covers are difficult to install, and can irritate the animal on which they are installed.

Furthermore, the traditional tail covers may not match the horse's tail and thus will be evident. An evident cover may actually be counter-productive since it may actually detract from the desired effect. This is especially true if the horse has little or no hair on it's tail.

No satisfactory solution to this problem has been provided with the only present answer being the just-mentioned practice of stuffing the tail into a long sock.

INVENTION SUMMARY

The present invention provides a tail cover that includes a body that is easily attached to a horse's tail and which includes a braided portion to which is attached a portion of either natural or synthetic hairs. The hairs of the tail cover are dyed, treated or otherwise customized to match, or complement, the tail of the horse to which it will be attached. Attachment means, such as hook-and-loop fasteners, or the like, are also mounted on the body and are used to mount the body and hair portion to the horse's tail.

Using the tail cover embodying the present invention will permit a user to exactly match a horse's tail with a tail cover that is easily and quickly attached to the horse. The tail cover embodying the present invention is easily and quickly removed from the horse for storage, cleaning or modification.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view of a tail cover for a horse embodying the present invention.

FIG. 2 shows the tail cover of FIG. 1 in place on a horse.

DETAILED DESCRIPTION OF THE INVENTION

FIG. 1 shows a tail cover 10 comprises a body 12 which has a first end edge 14 that is a top edge when body 12 is in place on a horse's tail T as shown in FIG. 2. First end edge 14 is arcuate. Body 12 further includes a second end edge 16 that is a bottom edge when body 12 is in place on the horse's tail. Body 12 further includes a first side edge 18 connecting first edge 14 to second edge 16, a second side edge 20 connecting first edge 14 to second edge 16 and a longitudinal axis 22 which extends between first end edge 14 and second end edge 16.

A braided portion 24 is located on longitudinal axis 22 and extends in the direction of the longitudinal axis from adjacent to first end edge 14 to adjacent to second end edge 16. Braided portion 24 has a first end 26 located on body 12 adjacent to first end edge 14 and a second end 28 located to be spaced from body 12 adjacent to second end edge 16. The orientation of braided portion 24 on body 12 permits tail cover 10 to be integrated into a horse's tail in an efficient and secure manner that is also aesthetically pleasing.

A plurality of first sections 30 are spaced apart from each other in the direction of longitudinal axis 22 and extend from longitudinal axis 22 toward the first side edge. One section 32 of the first sections defines a first portion 34 of second end edge 16. Each of the first sections has a first end 36 attached to braided portion 24.

A plurality of second sections 40 are spaced apart from each other in the direction of longitudinal axis 22 and extend from longitudinal axis 22 toward second side edge 20. One section 42 of the second sections defines a second portion 44 of second end edge 16. Each of the second sections has a first end 46 attached to braided portion 24. The first and second sections will integrate the device into the horse's tail so the tail will dominate the overall appearance of the combination.

A first side panel 50 has a first end 52 attached to first end edge 14, a second end 54 located adjacent to second end edge 16, a first side edge 56 attached to first sections 30, and a second side edge 58 that defines first side edge 18 of body 12. First side panel 50 extends in the direction of longitudinal axis 22.

A second side panel 60 has a first end 62 attached to first end edge 14, a second end 64 located adjacent to second end edge 16, a first side edge 66 attached to second sections 40, and a second side edge 68 that defines second side edge 20 of body 12. Second side panel 60 extends in the direction of longitudinal axis 22 of body 12.

A first hook-and-loop fastener element 70 is mounted on second side edge 58 of first side panel 50, and a second hook-and-loop fastener element 72 is mounted on second side edge 68 of second side panel 60. The hook-and-loop fastener elements co-operate with each other to releasably close body 12 into a tubular shape which is sized to accommodate tail T as can be understood from FIG. 2.

A horse hair section 80 of natural horse hairs 82 is integrated with braided section 24 to depend therefrom and to cover and be integrated with tail hairs TH of the horse in a secure and aesthetically pleasing manner. Section 80 has a first end 84 which is a top end when horse hair section 80 is attached to body 12 and a second end 86 which is a bottom end when horse hair section 80 is attached to body 12. The horse hairs of horse hair section 80 are colored and customized to be fully integrated with the hairs of the horse's tail. The hairs of section 80 can be either natural or synthetic as suitable. The customizing of the horse hairs will allow the device to match the horse so it will enhance the appearance rather than detract, especially if the horse has few hairs in its tail.

A ring 90 attaches the horse hairs of horse hair section 80 to second end 28 of braided portion 24. It is noted that one form of the invention includes the hairs 82 of section 80 being integral with, or even forming, braided portion 24, with ring 90 serving to hold the braids together and separate the braided portion from the remainder of the tail section.

Use of tail cover 10 can be understood from the teaching of the foregoing disclosure and thus will not be described in depth. A user customizes the hairs in section 80 to match and enhance the appearance of the hairs in the horse's tail, and then attaches cover 10 to the horse's tail by closing body 12 around the dock section of the horse's tail and attaching the hook-and-loop elements of the cover together. The customizing of cover 10 can be achieved by sending a sample of the hairs of the horse to a manufacturer and allowing the manufacturer match the hairs of section 80 to the sample hair supplied by the user. The hairs 82 of section 80 can then be combed or otherwise integrated into the hairs of the horse's tail. Removal of cover 10 is simple and involves merely releasing the hook-and-loop elements from each other and removing cover 10 from the horse's tail. It is also noted that body 12 can be formed to be stretchable so a single size body could be used on a large variety of horses if desired. Cover 10 will provide a braided appearance for a horse's tail and will enhance the appearance of the tail with only a minimal amount of work being required from the user.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A tail cover for use on a horse comprising:
A) a body having
  (1) a first end edge that is a top end edge when said body is in place on a horse's tail, the first end edge being arcuate,
  (2) a second end edge that is a bottom end edge when said body is in place on the horse's tail,
  (3) a first side edge connecting the first edge to the second edge,
  (4) a second side edge connecting the first edge to the second edge,
  (5) a longitudinal axis which extends between the first end edge and the second end edge,
  (6) a braided portion that is located on the longitudinal axis and which extends in the direction of the longitudinal axis from adjacent to the first end edge to adjacent to the second end edge, the braided portion having a first end located on said body adjacent to the first end edge and a second end located to be spaced from said body adjacent to the second end edge,
  (7) a plurality of first sections which are spaced apart from each other in the direction of the longitudinal axis and which extend from the longitudinal axis toward the first side edge, one section of the first sections defining a first portion of the second end edge, the first sections having a first end attached to the braided portion, and
  (8) a plurality of second sections which are spaced apart from each other in the direction of the longitudinal axis and which extend from the longitudinal axis toward the second side edge, one section of the second sections defining a second portion of the second end edge, the second sections having a first end attached to the braided portion;
B) a first side panel having
  (1) a first end attached to the first end edge
  (2) a second end located adjacent to the second end edge,
  (3) a first side edge attached to the first sections,
  (4) a second side edge that defines the first side edge of said body, and
  (5) said first side panel extending in the direction of the longitudinal axis of said body;
C) a second side panel having
  (1) a first end attached to the first end edge
  (2) a second end located adjacent to the second end edge,
  (3) a first side edge attached to the second sections,
  (4) a second side edge that defines the second side edge of said body, and
  (5) said second side panel extending in the direction of the longitudinal axis of said body;
D) a first hook-and-loop fastener element mounted on the second side edge of said first side panel;
E) a second hook-and-loop fastener element mounted on the second side edge of said second side panel;
F) said first and second hook-and-loop fastener elements being adapted to releasably attach to each other to form said body into a tubular shape;
G) a horse hair section of natural horse hairs having
  (1) a first end which is a top end when said home hair section is attached to said body, and
  (2) a second end which is a bottom end when said horse hair section is attached to said body;
H) the horse hairs of said horse hair section being colored and customized; and
I) a ring attaching the horse hairs of said horse hair section to the second end of the braided portion of said body.

* * * * *